June 19, 1923.
A. KROL
ANIMAL TRAP
Filed Aug. 23, 1922
1,459,027
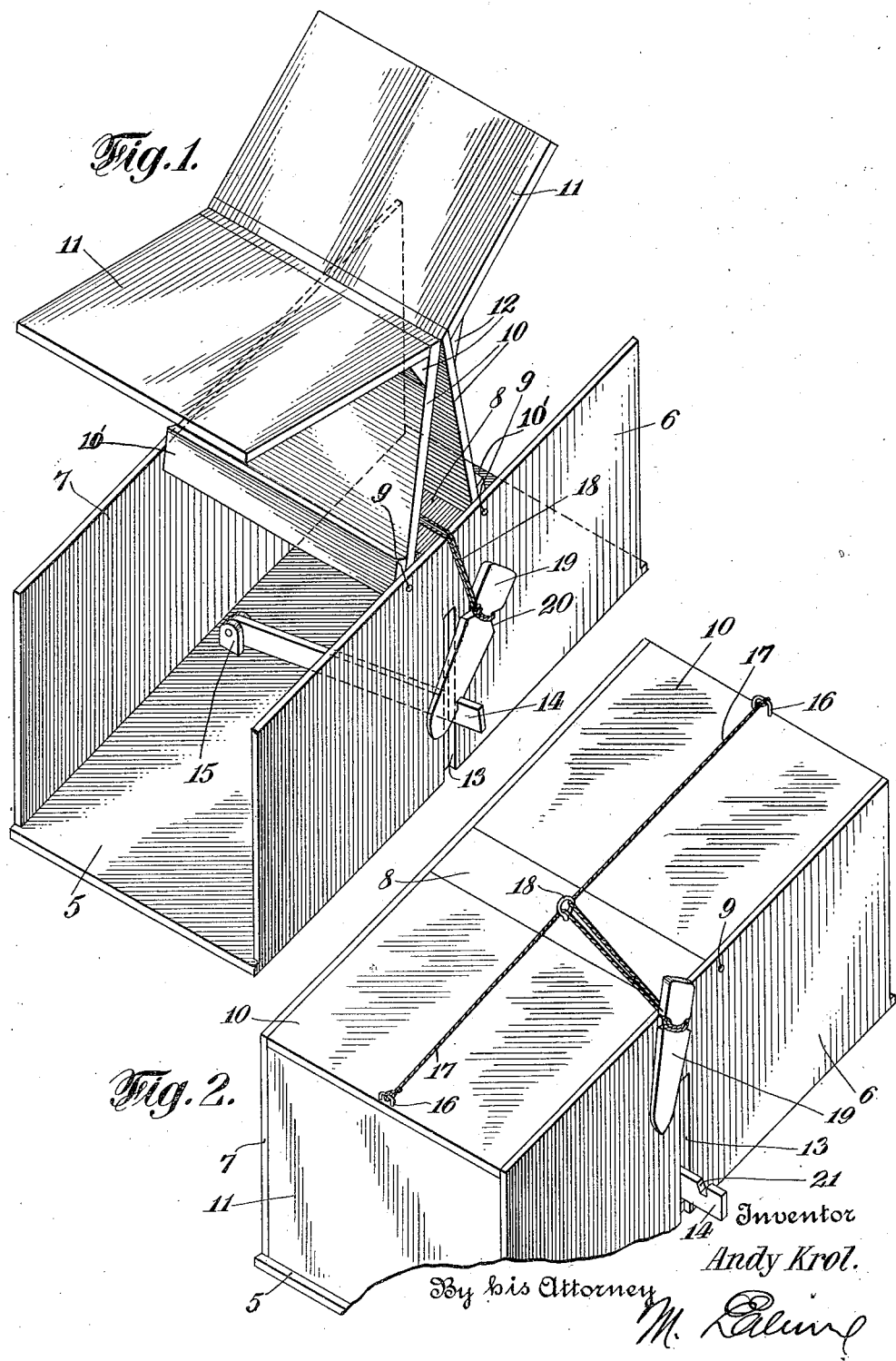

Patented June 19, 1923.

1,459,027

UNITED STATES PATENT OFFICE.

ANDY KROL, OF UNIONTOWN, PENNSYLVANIA.

ANIMAL TRAP.

Application filed August 23, 1922. Serial No. 583,695.

*To all whom it may concern:*

Be it known that I, ANDY KROL, a citizen of the United States, residing at Uniontown, in the county of Fayette and State of Pennsylvania, have invented certain new and useful Improvements in Animal Traps, of which the following is a specification.

This invention relates to improvements in traps for catching small animals alive and has as its object the provision of a simple, cheaply constructed trap, easily set and effective in operation.

This object is attained by the novel construction and combination of parts hereinafter described and shown in the accompanying drawing, forming a material part of this disclosure, and in which:—

Figure 1 is a perspective view of an embodiment of the invention, in a set or open position.

Figure 2 is a similar view of the same in a closed or operated position.

The invention, as illustrated, consists of an oblong rectangular structure, having a bottom or floor 5 from which rise sides respectively 6 and 7, the same being parallel and slightly shorter than the floor.

A bridge or partial cover 8 extends from one side to the other, at the center, at the top, this bridge being permanently fixed.

Pivoted on pins 9 are transverse bars 10' fixed to the lower sides of cover plates 10 which are thus enabled to be turned upward as shown in Figure 1 or downward, as shown in Figure 2 forming covers.

Attached to the outer edges of these plates, to extend at right angles, are other plates 11, constituting the ends of the structure, re-enforcements 12 being fixed at the inner corners of the plate joints as shown.

A slot 13 extends upwardly from the floor in the side 6, at its center, and movable in the slot is a lever 14 projecting outwardly at one end and having its inner end pivoted in a bracket 15 fixed on the floor 5 near the opposite side.

Fixed at the centers of the outer ends of the covers 10 are staples 16 to which are attached the ends of cords 17, passing through an eye 18 fixed in the bridge 8 and then tied around a trigger 19, provided with opposed notches 20 to receive the cord.

The trigger 19 is reduced in thickness, in the manner of a wedge, towards its opposite or point end, which is adapted to enter a notch 21 in the extending portion of the lever 14, the arrangement being such that when the lever is raised on its pivot, the notch will be closely adjacent the side wall 6, pressing the trigger into frictional contact therewith and holding the cord sufficiently taut to retain the cover and end elements in a raised position as shown in Figure 1.

This holding effect is further assisted by the balance of the covers, which are at that time in close proximity, the center of gravity being just beyond their pivoted points, so that when the lever is disturbed, as by an animal attracted by a lure or bait on the lever, the trigger will be displaced and both of the covers fall by gravity entrapping the animal within the enclosure in an obvious manner.

While the foregoing is descriptive of the preferred embodiment of the invention, obviously minor changes, not involving the invention may be made without departing from the spirit and scope of the appended claim.

Having thus described my invention, what I claim as new and desire to secure, by Letters Patent, is:—

A trap comprising a structure having a floor, fixed side walls, one of said walls being vertically slotted, a bridge between said side walls, a pair of oppositely disposed cover plates pivoted between said side walls adjacent opposite ends of said bridge, cords attached to the cover plates, a ring in said bridge through which the cords pass, a lever pivoted to the floor to extend outwardly through the mentioned slot, said lever having a notch in its upper edge partially within and partially beyond the slot, and a wedge-shaped trigger to which said cords are attached, said trigger being engageable in the notch of said lever whereby the same is held in frictional contact with one side wall of the box, and said covers are normally held in a raised position.

In witness whereof I have affixed my signature.

ANDY KROL.